(No Model.)
J. E. KELLY.
POTATO DIGGER.
No. 438,688.  Patented Oct. 21, 1890.
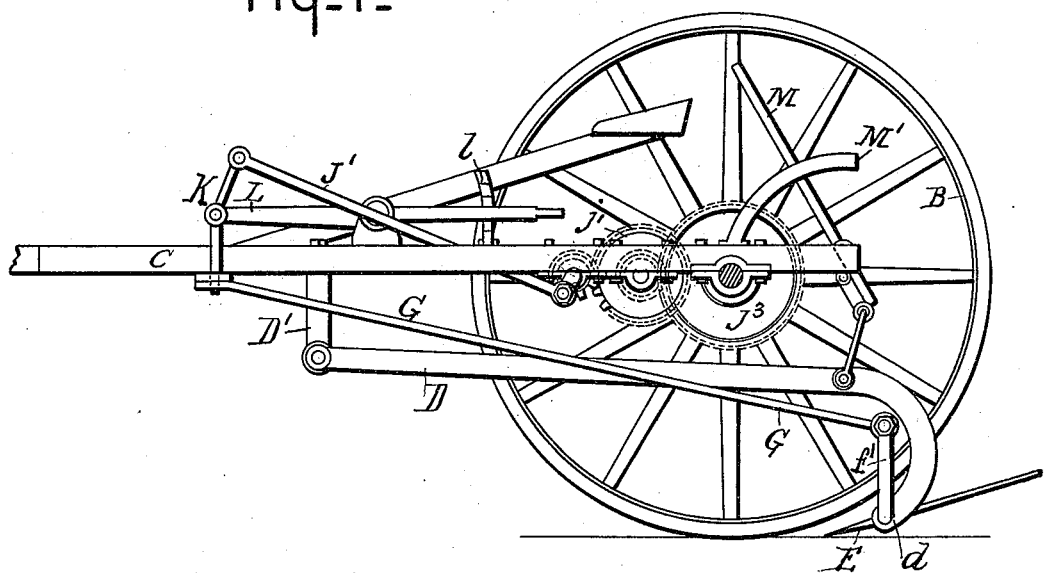
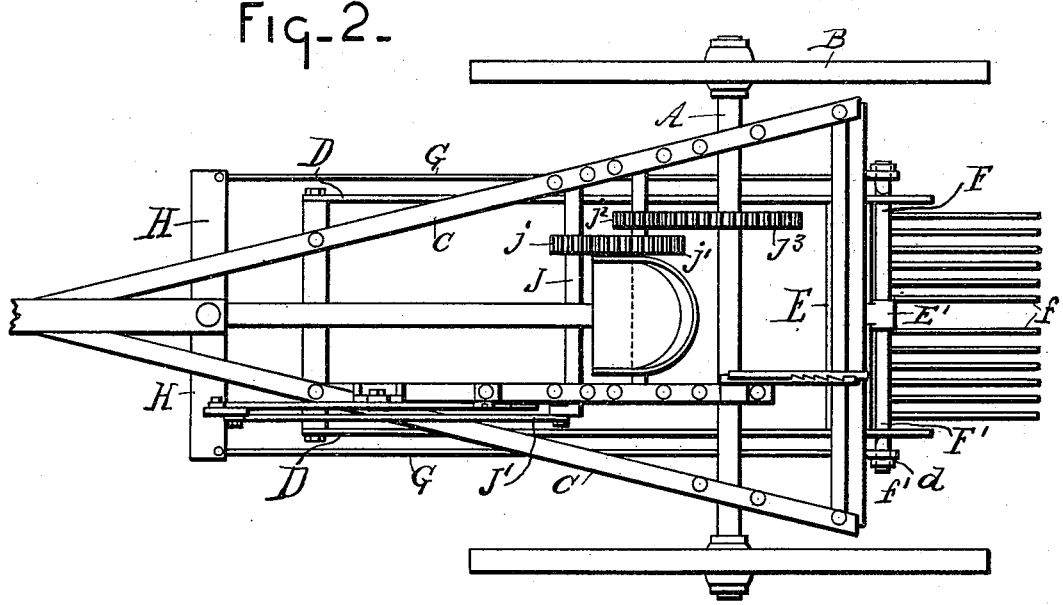
WITNESSES
C. J. Shipley
F. Clough
INVENTOR
John E. Kelly
By Wells W. Leggett & Co.
Attorneys.

UNITED STATES PATENT OFFICE.

JOHN E. KELLY, OF HIGHLAND STATION, MICHIGAN.

POTATO-DIGGER.

SPECIFICATION forming part of Letters Patent No. 438,688, dated October 21, 1890.

Application filed March 15 1890. Serial No. 343,960. (No model.)

*To all whom it may concern:*

Be it known that I, JOHN E. KELLY, a citizen of the United States, residing at Highland Station, county of Oakland, State of Michigan, have invented a certain new and useful Improvement in Potato-Diggers; and I declare the following to be a full, clear, and exact description of the invention, such as will enable others skilled in the art to which it pertains to make and use the same, reference being had to the accompanying drawings, which form a part of this specification.

My invention is designed to produce a potato-digger which shall be simple in operation, and yet will perform its work thoroughly and easily; and it consists in a combination of devices and appliances hereinafter described and claimed.

In the drawings, Figure 1 is a side elevation of an apparatus embodying my invention. Fig. 2 is a plan view of the same.

In carrying out my invention A represents the axle, B the wheels, and C a suitable frame-work for supporting my apparatus.

D are beams, their forward ends pivoted to the hangers D', which are attached to the frame. Extending between the rear ends of these beams and rigidly engaged thereto is the knife or scooper blade E.

F F' are the shakers, having the tines $f$, projecting rearward. One end of each shaker is journaled in the box E', attached about the middle of the knife. Attached to the ends of the beams are suitable journals $d$, through which the shaker-bars are passed. They are then bent upward, as at $f'$. To the upper ends are pivoted the bars G, which extend forward and are engaged to the walking-beam H.

J is a crank-shaft connected with the walking-beam by the pitman J'. This crank-shaft receives motion from the axle by means of the pinions $j\ j'\ j^2\ j^3$. Thus the motion of the axle operates the shaker-bars. In order that this motion may be regulated, I provide between the end of the pitman J' and the walking-beam H the adjustable pivoted lever K, the pitman J' being pivoted to one end and the other end entering an orifice in the walking-beam. This lever K is pivoted on the end of the adjustable lever L, and the latter being adjustable on the rack-bar $l$ the lever K can be raised or lowered in the walking-beam H, and thus give the latter a greater or less stroke, as desired.

M is a suitable lever connected with the beams for permanently raising or lowering them, and M' the rack-bar for holding said lever M in position.

The operation will at once be seen. By means of the lever M the knife is lowered and is made to strike into the soil, running a short distance beneath the surface. The potatoes are thus loosened and carried onto the shakers. The motion of the wheels and axle is, as before explained, imparted to the shakers. These will shake off the soil from the potatoes, and the tines will keep them up while the soil drops through. As more potatoes are thrown upon the shakers, those already on will be worked off and dropped on the surface.

Of course any suitable frame-work may be used to support the apparatus and any suitable lever or levers be used to raise the knife and shakers, and the crank-shaft J may be in any position and motion imparted to it in any suitable manner—as, for instance, the end of the crank-shaft might be provided with a small gear, which might be made to mesh with a gear attached to the inner face of the drive-wheel, or the drive wheel or axle may be provided with a sprocket-wheel, and the end of the crank-shaft also be provided with a sprocket-wheel and a sprocket-chain connect them. These forms would of course be the equivalent of the above, and would be contemplated by me.

What I claim is—

1. In a potato-digger, the combination of a wheel-frame C, the vertically-swinging beams D, suspended at their forward ends from the wheel-frame and carrying the scoop E, the shakers F F', journaled on the rear ends of the beams behind the scoop and having the cranks $f'$, a walking-beam H, the bars G, connecting the cranks to the walking-beam, and a crank-shaft J, rotated by the wheels of the frame and having a pitman-connection with the walking-beam, substantially as described.

2. In a potato-digger, the combination, with a wheel-frame C and the pivoted beams D, of the scoop E, the shakers F F', journaled on the rear ends of the beams and having cranks f', a swinging lever L on the wheel-frame, the walking-beam H, the adjustable lever K, connecting the said swinging lever with the walking-beam to vary the stroke of the latter, and a shaft J, connected with the said adjustable lever to operate the walking-beam, substantially as described.

3. In a potato-digger, the combination of a wheel-frame C, the swinging beams D, carrying the scoop E and suspended at their front ends from the wheel-frame, a lever M for raising and lowering the beams, the shakers F F', journaled on the rear ends of the beams and having cranks f', the walking-beam H, having bar-connections G with the cranks, and the crank-shaft J, having a pitman-connection J' with the walking-beam for operating the same, substantially as described.

4. In a potato-digger, the combination, with the scoop E and the shakers F F', having cranks f', of the walking-beam H, having bar-connections G with the cranks, a lever L, having the adjustable lever K loosely engaging the walking-beam to vary the stroke of the latter, and a crank-shaft J, having a pitman-connection J' with the said adjustable lever, substantially as described.

In testimony whereof I sign this specification in the presence of two witnesses.

JOHN E. KELLY.

Witnesses:
C. J. SHIPLEY,
F. CLOUGH.